United States Patent [19]

Saeger et al.

[11] Patent Number: 5,262,864
[45] Date of Patent: Nov. 16, 1993

[54] FRAME BASED VERTICAL PANNING SYSTEM

[75] Inventors: Timothy W. Saeger, Indianapolis; Nathaniel H. Ersoz, Brownsburg, both of Ind.

[73] Assignee: Thomson Consumer Electronics, Inc., Indianapolis, Ind.

[21] Appl. No.: 911,870

[22] Filed: Jul. 10, 1992

[51] Int. Cl.⁵ .................... H04N 3/223; H04N 5/262
[52] U.S. Cl. .................... 358/180; 358/183
[58] Field of Search ............... 358/180, 182, 183, 22, 358/242, 188

[56] References Cited

U.S. PATENT DOCUMENTS

| | | | |
|---|---|---|---|
| 4,079,413 | 3/1978 | Yamashita | 358/83 |
| 4,163,992 | 8/1979 | Inaba et al. | 358/183 |
| 4,249,213 | 3/1981 | Imaide et al. | 358/183 |
| 4,746,981 | 5/1988 | Nadan et al. | 358/160 |
| 4,800,430 | 1/1989 | Murakami et al. | 358/160 |
| 4,821,086 | 4/1989 | McNeely et al. | 358/22 |
| 4,878,117 | 10/1989 | Ikehira et al. | 358/183 |
| 4,891,705 | 1/1990 | Suzuki et al. | 358/148 |
| 5,136,398 | 8/1992 | Rodriguez-Cavazos et al. | 358/242 |

FOREIGN PATENT DOCUMENTS

WO91/19378 12/1991 PCT Int'l Appl. .

Primary Examiner—Mark R. Powell
Assistant Examiner—John W. Miller
Attorney, Agent, or Firm—Joseph S. Tripoli; Joseph J. Laks; Harvey D. Fried

[57] ABSTRACT

A television apparatus comprises a display for a video signal and a panning control circuit. The panning control circuit counts the horizontal lines, or half lines, and generates a vertical reset signal delayed by a variable pan delay relative to the vertical synchronizing component of the video signal. The pan delay varies in a first range for vertically panning the video signal down and varies in a second range for vertically panning the video signal up. The first and second ranges are mutually exclusive to control interline flicker of the panned video signal when successive fields have different numbers of horizontal lines. The first range is less than the number of horizontal lines in each field and the second range is greater than the number of horizontal lines in each field and less than the number of horizontal lines in each frame.

21 Claims, 8 Drawing Sheets

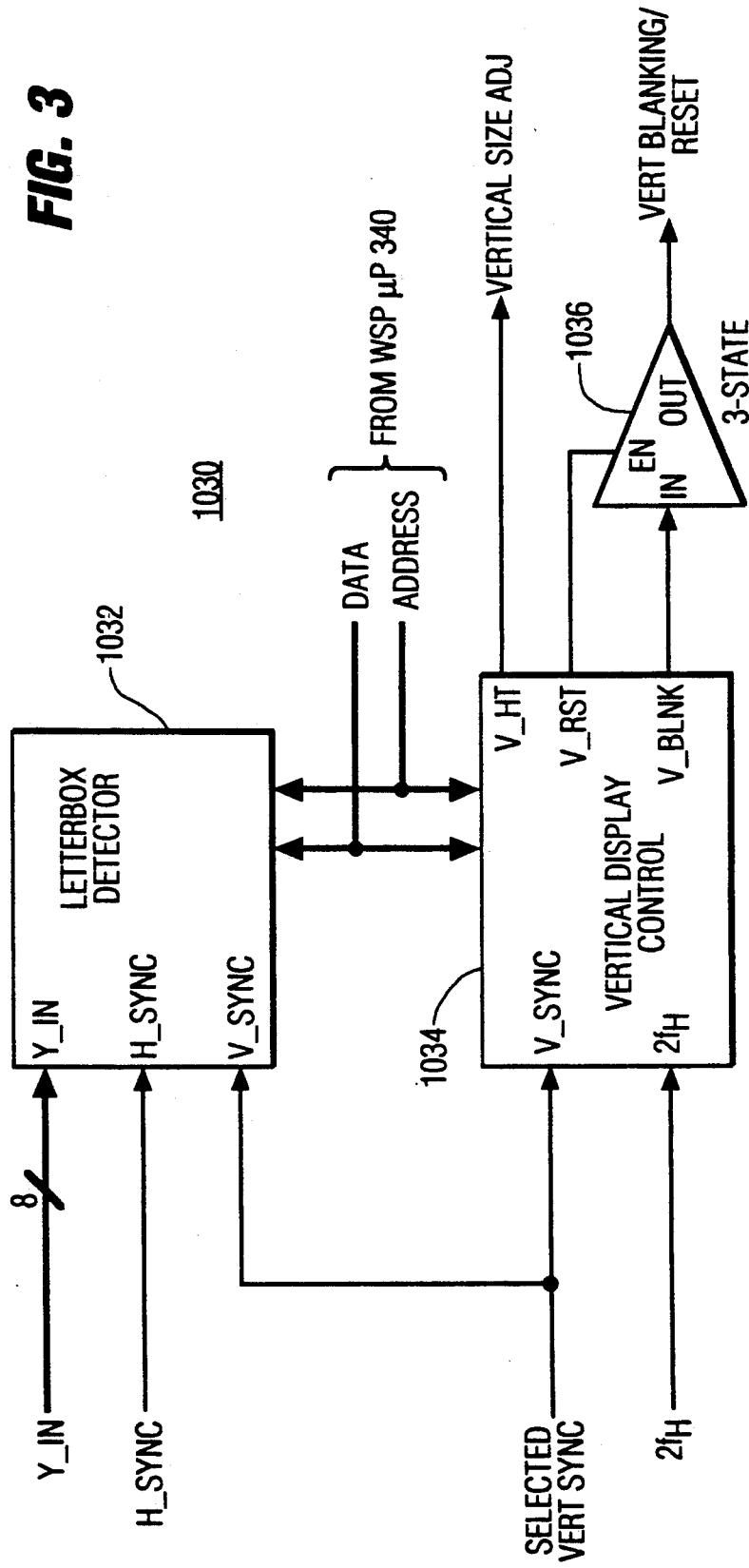

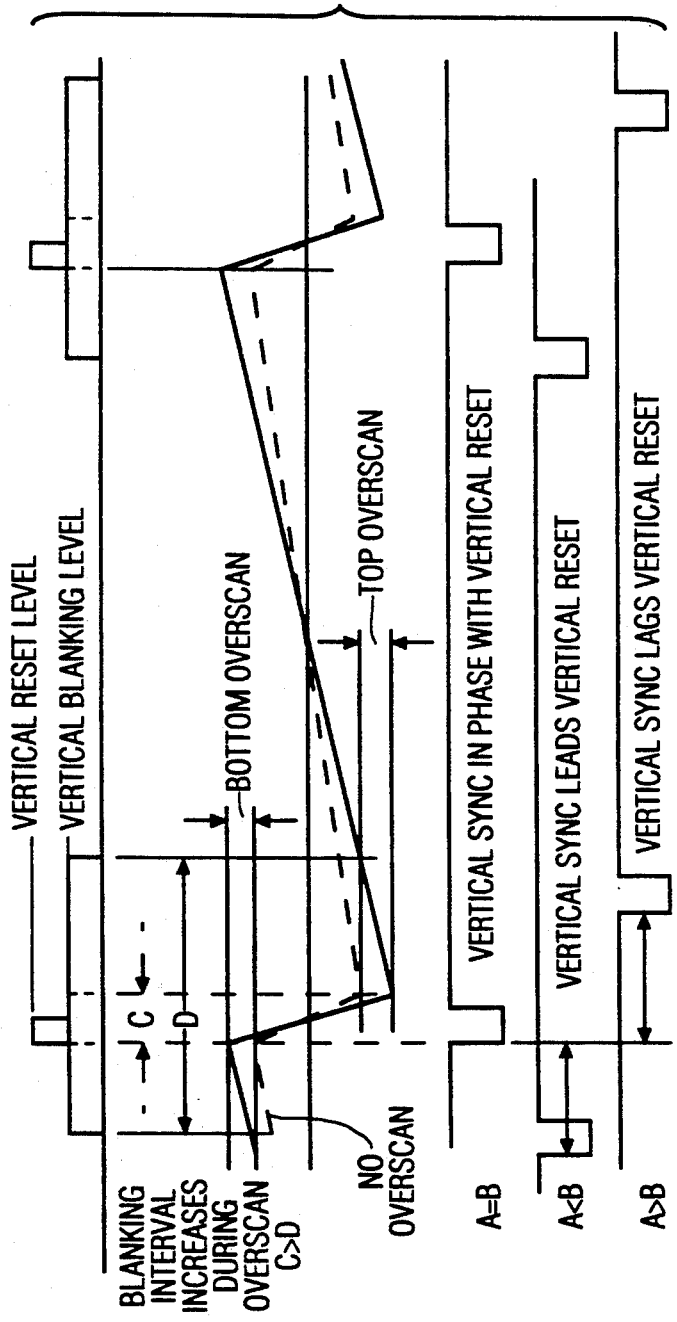
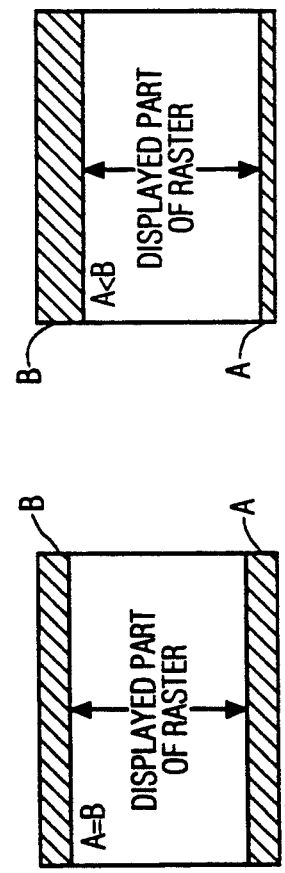

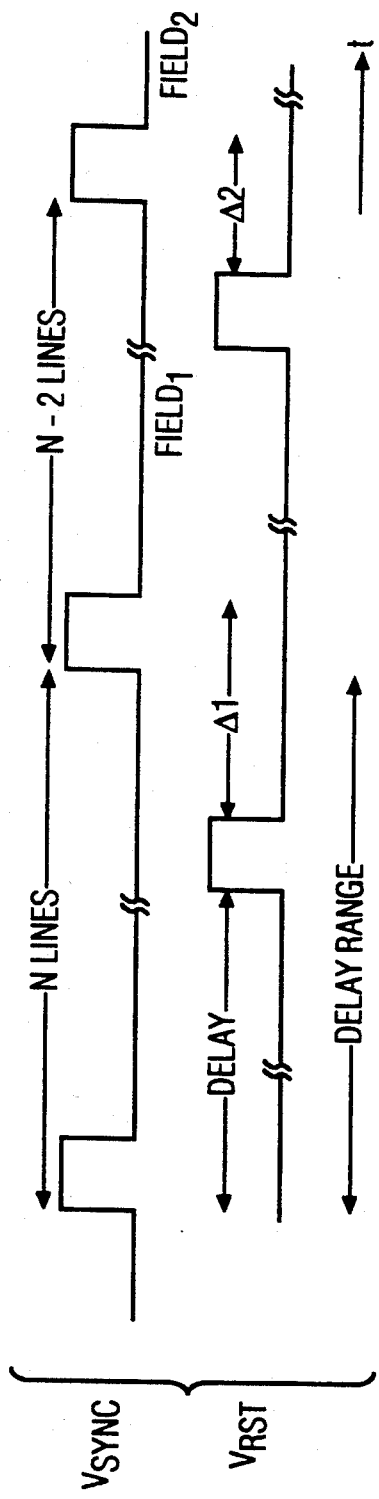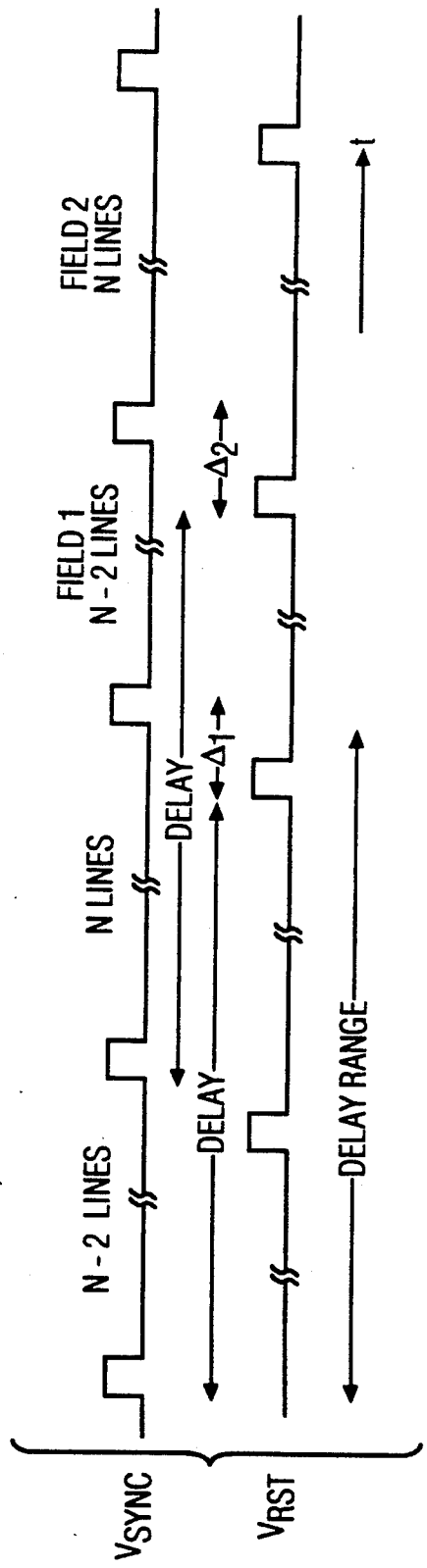

FRAME BASED VERTICAL PANNING SYSTEM

The invention relates to television receivers operable to display an image which does not correspond to the aspect ratio of the display, including means for controllably panning the image vertically. In particular, the invention provides a means for generating vertical reset and blanking signals for panning in a wide screen television apparatus, in a manner which accommodates certain display situations wherein the number of lines in successive video fields is unequal.

A conventional television receiver has a format display ratio measuring four horizontal units by three vertical units, generally referred to as 4×3, and most commercial broadcasters, except for experimental purposes, produce signals which correspond to this ratio. Movies, on the other hand, are often produced in a format display ratio which is relatively wider in its horizontal direction, for example 16×9 (i.e., 4×2.25). Various specific ratios are possible. Viewers have come to associate the relatively wider presentation with movies and the relatively narrower presentation with home viewing. As a result, many viewers find the wider format display ratio more pleasing in that it looks like a movie instead of a conventional commercial broadcast.

When displaying a program having a wide screen format display ratio on a 4×3 screen, or when displaying a 4×3 program on a wide screen display, it is necessary to accommodate the difference. In a so-called "letterbox" arrangement, a wide screen signal is displayed on a 4×3 ratio display, with bands at the top and/or bottom of the display left blank or used for messages, simultaneous display of other images or the like. Conversely, in displaying a 4×3 signal on a wide screen display, unused side areas can display simultaneous images or the like.

Wide screen television receivers can be arranged to display television signals in a variety of ways. Such receivers can detect signals in letterbox format, and expand the 4×3 received signal such that the blank top and bottom bands are cropped and the signal fills a 16×9 display area. The receiver can also expand or zoom a non-letterbox signal (e.g., 4×3) while cropping active video areas at the top and bottom, to fill the wide screen display. Along with this feature is the additional capability to generate vertical blanking and reset signals to display the zoomed source.

It can be a complicated problem to arrange to display both conventional and wide display format signals, as well as combinations thereof, including multiple picture displays. Changing the display format ratios of multiple signal sources may entail developing consistent timing signals from asynchronous sources, switching between multiple sources, compressing the signals, expanding the signals with additional interpolated lines, or various combinations thereof.

Not all letterbox signals are centered vertically. Where a 4×3 signal is zoomed, thereby cropping vertically, it may be desirable to crop the top more than the bottom, or vice versa, such that the more interesting portion of the signal is retained. Therefore, a vertical panning capability is advantageous.

A vertical display control circuit controls which part of the overscanned raster will be displayed on the screen, which is described herein as vertical panning. If the vertically overscanned video signal is not in letterbox format, the picture can be zoomed, that is expanded both vertically and horizontally, to simulate a wide screen display format without distorting the displayed portion of the signal. Assuming, by way of example, a change from a 4×3 signal to a 16×9 display (although other specific ratios are possible), one third of the vertical dimension of the picture is cropped. Many vertical deflection systems are AC-coupled. As a result, pictures are always vertically centered on the display. For a 4:3 picture zoomed for display on a 16:9 display, the top one sixth and bottom one sixth of the picture will always be cropped.

The picture content may make it more appropriate to crop more at the top or bottom. For example, where the action in a picture is at ground level, the viewer might prefer to crop more of the sky. A vertical panning capability enables a choice as to which part of the zoomed picture will be cropped. This can be accomplished by generation of a vertical reset pulse that is delayed by a selectably variable amount from the leading edge of a processed vertical synchronizing pulse based on the video signal received, referred to as VSYNC. A vertical blanking pulse is likewise generated. The vertical reset pulse is used by the chassis to initiate a vertical retrace, and during the blanking interval defined by the vertical blanking pulse the electron beam is disabled. Since the video output of the wide screen processor is not delayed, a vertical panning feature is created by the appropriate manipulation of vertical blanking and vertical reset pulse delay relative to VSYNC.

One may wish to pan up or down. Panning directions are defined herein in terms of the direction in which the field of view moves over the expanded or zoomed picture. Panning down, for example, will reveal picture content in a lower part of the zoomed picture and will crop picture content from an upper part of the zoomed picture. Panning the video down may also be thought of as scrolling the picture up. Conversely, panning the video up may also be thought of as scrolling the video down. Panning down involves a delay of vertical reset and blanking for each field (of two interleaved fields) by some number of horizontal lines which is less than that of the field. For NTSC, each field is 262.5 lines. Panning up, on the other hand, would require moving the vertical reset and blanking pulses ahead in time relative to VSYNC, which of course is not possible in an AC-coupled vertical deflection system if VSYNC is the triggering signal.

A problem is encountered when vertical panning is used in conjunction with certain special effects modes, for example during VCR playback. In fast forward mode of a VCR, due to the non-standard nature of the linear tape speed, the number of lines in a field is decreased relative to the standard number by a number of lines which is dependent on the recording mode used (for example, SP or SLP) and the linear tape speed. In the example of a five line down-pan, and assuming a nominal number of lines in the field of 253.5 (characteristic of VCR fast forward playback of a tape recorded in SP mode), the delay for the desired pan is 257.5 lines. However, a new VSYNC occurs every 253.5 lines. The new VSYNC, which is the triggering signal on which the delay is based, resets the line counter. As a result, no vertical reset occurs because the line counter is repeatedly reset without ever reaching the desired delay value. Without a vertical reset, the raster collapses vertically, possibly causing damage to the phosphors of the picture tube.

In order to ensure that this condition cannot occur, it is necessary to force the occurrence of a vertical reset pulse regardless of the phase difference between VSYNC and the vertical reset. The vertical reset is generated by VSYNC (without a delay) if a second VSYNC occurs before the line count reaches the desired panning delay. The vertical panning circuit for displaying a selected (vertically cropped) portion of a zoomed picture provides a line count defining the video line delay interval for initiating vertical reset and blanking pulses which are delayed relative to the vertical synchronizing component VSYNC of the video signal. A line counter generates the delayed reset pulses when fields occur having numbers of video lines greater than or equal to the line delay interval, which is the usual condition. Additionally, a gating circuit is provided, responsive to the vertical synchronizing component, to generate the reset and blanking pulses when fields occur that have a number of lines less than the panning delay interval. Thus, panning is made possible and the raster cannot collapse.

For a standard NTSC signal comprising fields having 262.5 lines (i.e., 525 half lines), both panning up and panning down may be accomplished by delaying the vertical reset signal by a number of half lines less than or equal to that of one field. The panning down delay is between zero and 262.5 half lines. The panning up delay is between 262.5 and 525 half lines. However, this solution still will not accommodate non-standard signals which are produced, for example, in certain modes of VCR playback. Where the non-standard signal is such that the field lengths are not equal, such as pause for a dual azimuth four head VCR, panning up produces an interline flicker with the offset between fields being equal to the difference in the number of lines between successive fields. The respective lines of the successive fields displayed are not aligned. The result is a very severe artifact which effectively makes the picture unwatchable.

It is an aspect of the invention to provide a vertical panning system particularly suited for AC-coupled vertical deflection systems.

It is a further aspect of the present invention to accommodate zooming and panning in a non-standard display situation characterized by unequal field lengths. This is accomplished by relying on a frame delay rather than a field delay. The vertical reset is delayed by up to one frame instead of up to one field. This can correct the problem because the frame length is constant even though the fields are of different lengths.

It is another aspect of the invention to remove interline flicker in such a situation by ensuring that the distance between the vertical reset pulse and the beginning of each video field is constant, such that the lines of successive fields always align, even where the fields have different line counts.

It is yet another aspect of the invention to generate pan-delayed signals for both vertical reset and vertical blanking, according to a user selectable amount of up or down panning.

These and other aspects of the invention are provided in a television apparatus, for example a wide screen receiver, comprising a display for a video signal and a panning control circuit. The panning control circuit counts the horizontal lines, or half lines, and generates a vertical reset signal delayed by a variable pan delay relative to the vertical synchronizing component of the video signal. The pan delay varies in a first range for vertically panning the video signal down and varies in a second range for vertically panning the video signal up. The first and second ranges are mutually exclusive to control interline flicker of the panned video signal when successive fields have different numbers of horizontal lines, such as during the pause mode of VCR playback wherein the number of lines per field varies as a function of tape speed and recording mode. The first range is less than the number of horizontal lines in each field and the second range is greater than the number of horizontal lines in each field and less than the number of horizontal lines in each frame. The apparatus may further comprise a circuit for zooming the video signal to exceed the display in vertical size. In this mode, the pan delay controls which vertically defined portion of the video signal appears on the display. The panning control can be responsive to manual selection of the panning delay. In an embodiment where the panning control circuit counts horizontal half lines, and for an NTSC signal, the first range is between zero and 262.5 half lines and the second range is between 787.5 and 1050 half lines.

The panning control circuit can comprise: a source for generating a line signal representing horizontal lines; a signal processor, for example a microprocessor, for determining a panning delay line count; a counter for accumulating a line count for each successive fields of each of frame; and, at least one comparator for generating the vertical reset signal when the line count equals the panning delay line count. A toggling circuit can be responsive to the vertical synchronizing component and operable to gate the line signal to a count input of the counter corresponding to a present fields.

FIG. 3 is a block diagram showing a vertical size control circuit, including a letterbox detector.

FIG. 4 is a timing diagram illustrating aspects of vertical panning.

FIGS. 5(a)-5(c) are display format diagrams useful for explaining aspects of vertical panning in connection with FIG. 4.

FIG. 6 is a timing diagram illustrating the relationship of certain vertical drive and vertical reset signals.

FIG. 7 is a timing diagram illustrating the relationship of vertical drive and vertical reset signals according to the invention.

Figure 8:
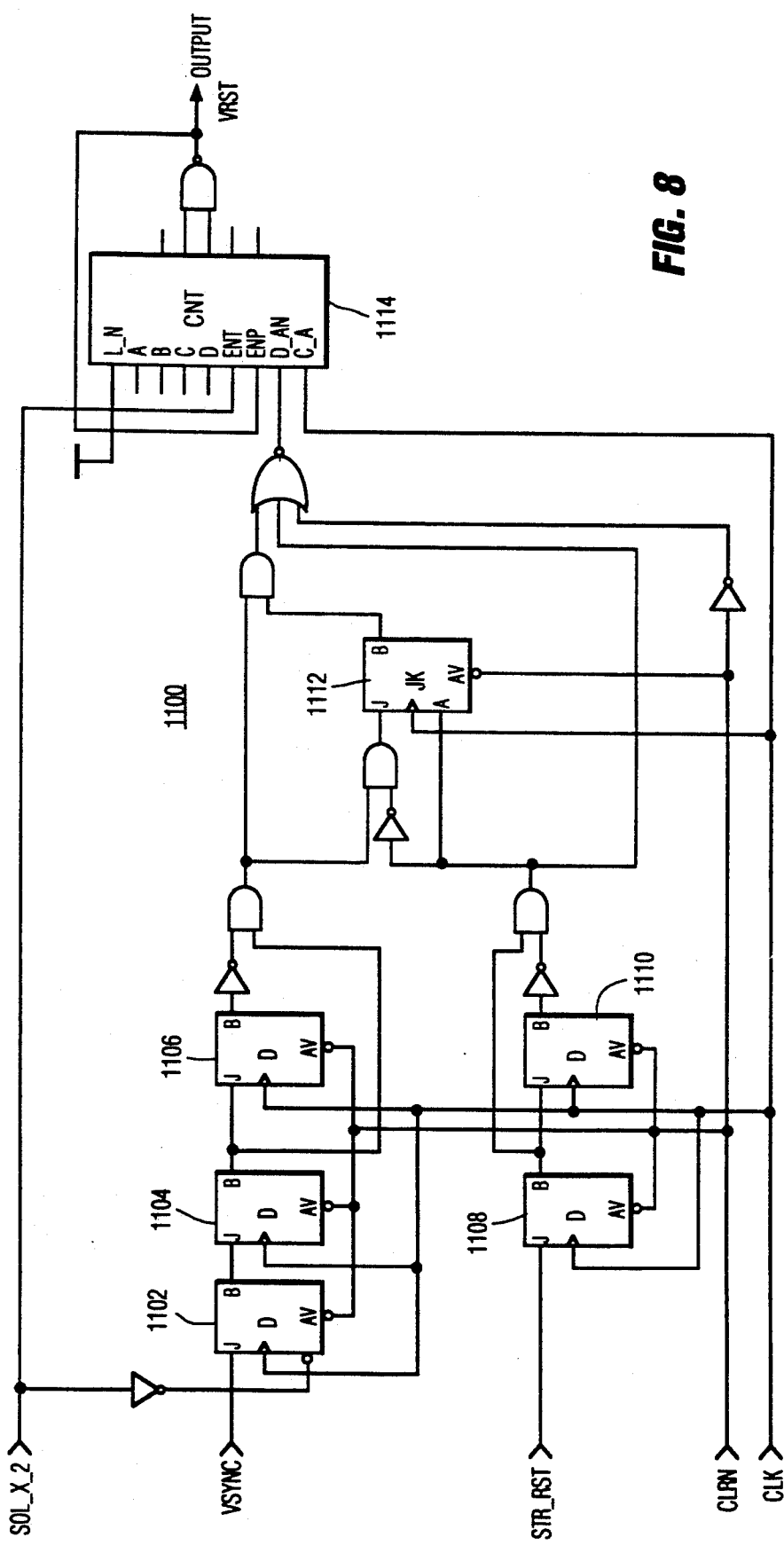

FIG. 8 is a circuit diagram illustrating a means for generating a forced vertical reset.

Figure 9:
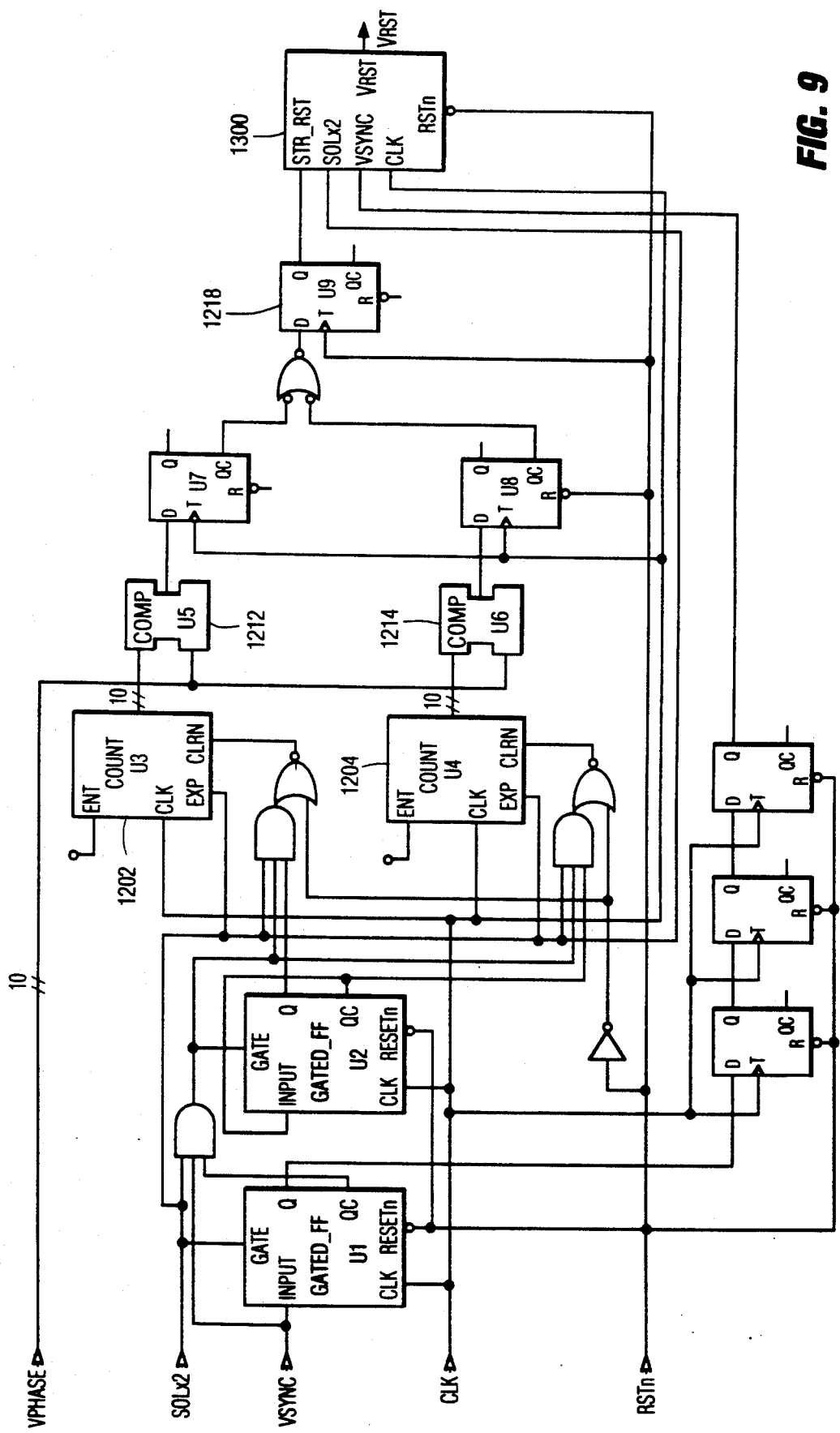

FIG. 9 is a circuit diagram illustrating a circuit for generating a pan delayed vertical reset for a frame based vertical panning system.

Figure 10:
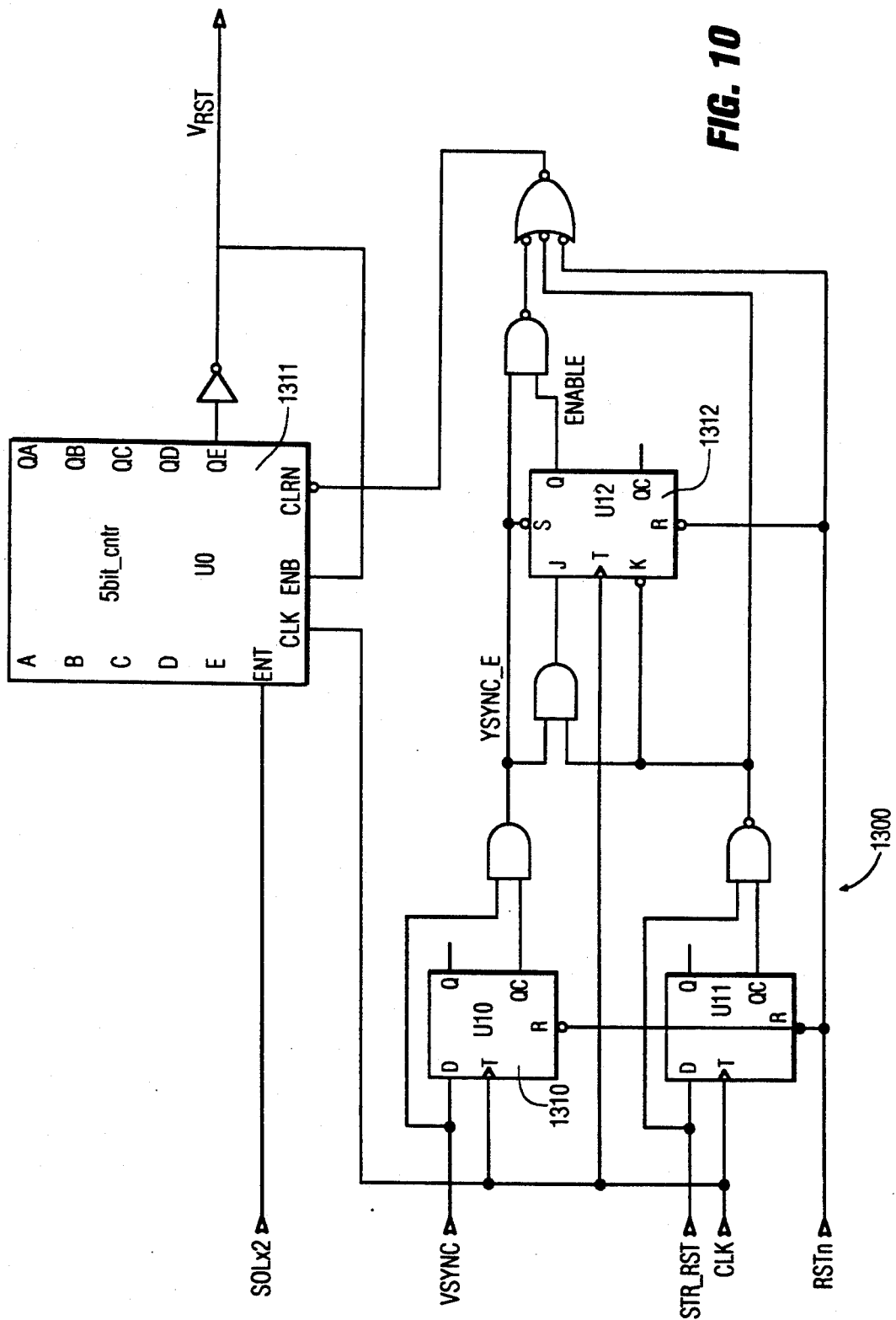

FIG. 10 is a circuit diagram illustrating in detail a circuit for generating a forced reset, for use in conjunction with the circuit of FIG. 9.

Figure 1:
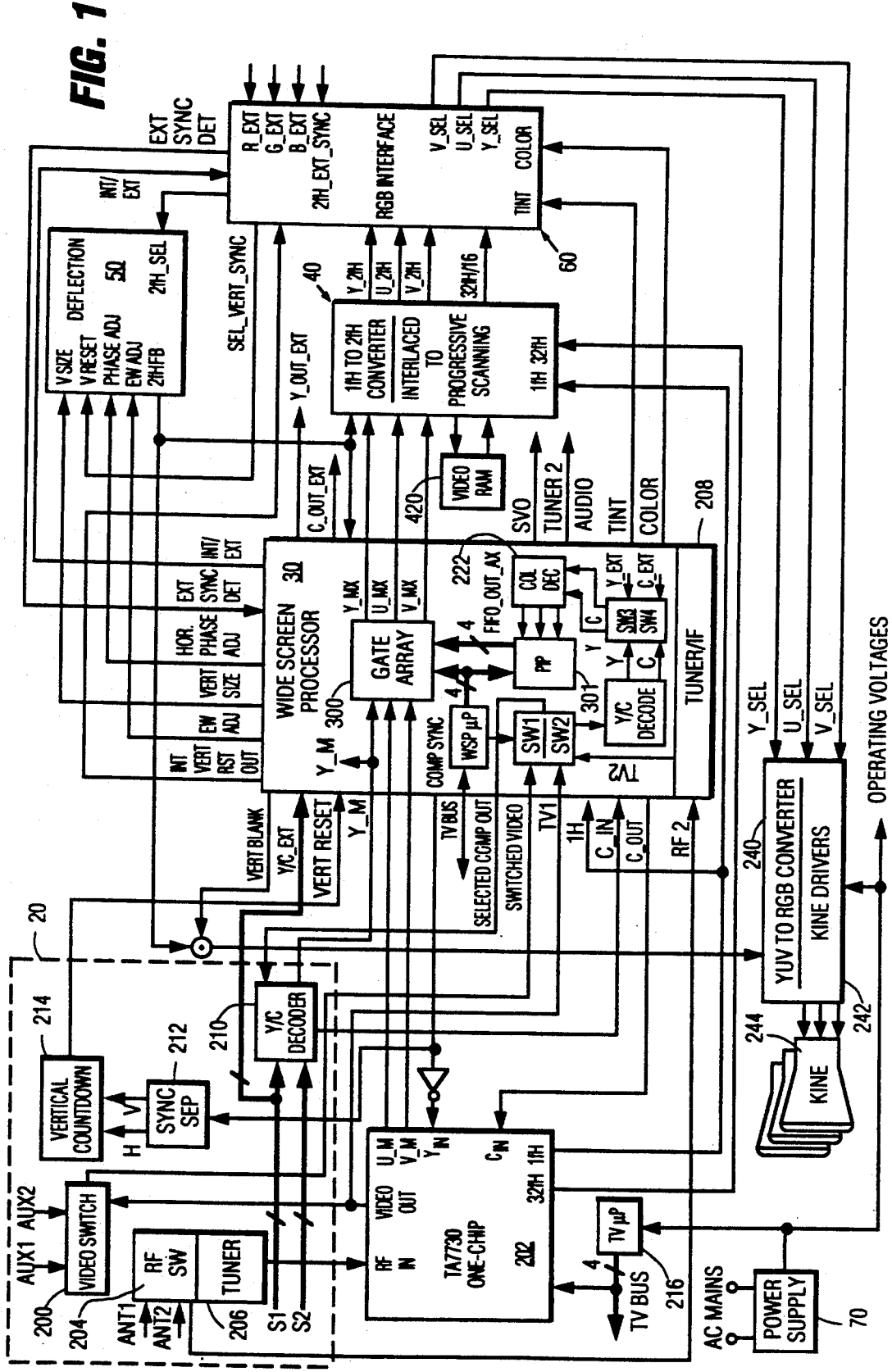
FIG. 1 is a schematic diagram generally illustrating the component parts of a wide screen television apparatus incorporating a frame based vertical panning control according to an aspect of the invention.

A block diagram for a wide screen television according to the invention is shown in FIG. 1. The television can be arranged to operate with $2f_H$ non-interlaced horizontal scanning or with conventional horizontal scanning, a non-interlaced version being shown. The television receiver in general comprises a power supply 70, a video signal input section 20, a chassis or TV microprocessor 216 coupled to a one-chip processor 202, a wide screen processor 30, a $1f_H$ to $2f_H$ converter 40, a deflection circuit 50, an RGB interface 60, a YUV to RGB converter 240, kine drivers 242, and display tube arrangement 244, which may be arranged for projection or direct view. The grouping of the various circuits into functional block is made for convenience in describing operation of the television, and is not intended to be limiting as to the physical positions and functional coupling of the circuits relative to one another.

The video signal input section 20 can receive, select or display simultaneously a plurality of composite video signals from different sources, e.g., broadcast or cable signals at ANT1 and ANT2, selectable by RF switch 204 for coupling to first tuner 206 and second tuner 208. the output of the first tuner 206 is coupled to one-chip circuit 202, for example industry designated type TA7730, which performs certain tuning, deflection and video control functions. A VIDEO OUT baseband signal from the one-chip 202 is coupled to video switch 200 and to TV1 input of wide screen processor 30. Auxiliary inputs AUX1 and AUX2 are available for other sources such as video cameras, laser disc players, video tape players, video games, etc., and are selected by video switch 200 for coupling to the SWITCHED VIDEO input to wide screen processor 30. The selected composite video signal (SELECTED COMP OUT) is input to Y/C decoder 210, together with further video sources S1, S2, and responsive to TV microprocessor 216 selects a pair of luminance and chrominance signals (thereafter considered the "main" signal), for coupling to the wide screen processor 30 as Y_M and C_IN. These signals are coupled back to the one-chip 202, for developing color difference signals U_M and V_M, equivalent to R−Y and B−Y signals. These signals are converted to digital form for further processing.

The second tuner 208 develops baseband video signal TV2, selectable for input to the Y/C decoder together with SWITCHED VIDEO. Switches SW3 and SW4 select these signals Y, C, or external signals Y_EXT and C_EXT corresponding to input S1, considered the auxiliary signal. The main signal path is designated with the suffix "_M" and the auxiliary signal path is designated "_A" in the respective signals. The respective signals can be processed for display alternatively or for display in a picture-in-picture mode via PIP circuit 301.

A composite synchronizing signal COMP SYNC, corresponding to Y_M, is provided by wide screen processor 30 to a sync separator 212, producing horizontal and vertical synchronizing signals H and V, which are input to vertical countdown circuit 214. The vertical countdown circuit develops a VERTICAL RESET signal coupled to the wide screen processor 30. The wide screen processor generates an internal vertical reset output signal IN VERT RST OUT to RGB interface 60, and a switch in the RGB interface selects between the internal vertical reset output signal and the vertical synchronizing component of the external RGB source. The output of this switch is a selected vertical synchronizing component SEL_VERT_SYNC, directed to the deflection circuit 50. Horizontal and vertical synchronizing signals for the auxiliary video signal are developed by a sync separator in the wide screen processor 30.

The 1$f_H$ to 2$f_H$ converter 40 changes interlaced video signals to progressively scanned, non-interlaced signals. Video RAM 420 can be used to store an adjacent field or frame for supplying the lines, or every other line, or lines can be repeated or interpolated, e.g., displaying horizontal lines twice or selecting a line based on detected movement in the picture. The converted video data is supplied to RGB interface 60 as Y_2$f_H$, U_2$f_H$ and V_2$f_H$. The RGB interface enables selection of the converted video data or an external RGB video signal, then coupled to the video signal input section. External RGB is deemed to be a wide format display ratio signal adapted for 2$f_H$ scanning. The vertical synchronizing component of the main signal is coupled to the RGB interface (as INT VERT RST OUT), for selecting the vertical sync applied to the deflection circuit 50, together with the user's selection of internal or external RGB signals. However, to prevent vertical raster collapse, the RGB interface circuit detects an external synchronizing signal and will override the selection of a non-existent external RGB signal. A microprocessor WSP $\mu$P in wide screen processor 30 supplies color and tint controls for external RGB.

A picture-in-picture processor 301, in conjuction with gate array 300 combines the main and auxiliary video signal data to provide a wide variety of display formats which can be selected, for example with a compressed version of an auxiliary signal displayed in the top or bottom margins of a letterbox main display signal, along the lateral sides of a 4×3 main display signal, etc. The wide screen microprocessor WSP $\mu$P is responsive to the TV microprocessor 216 over a serial bus. The wide screen processor 30 also generates a composite vertical blanking/reset signal, as a three level sandcastle signal. The vertical blanking and reset signals can also be generated as separate signals, as discussed more fully hereinafter, in connection with panning controls. A composite blanking signal is supplied by the video signal input section to the RGB interface.

Figure 2:
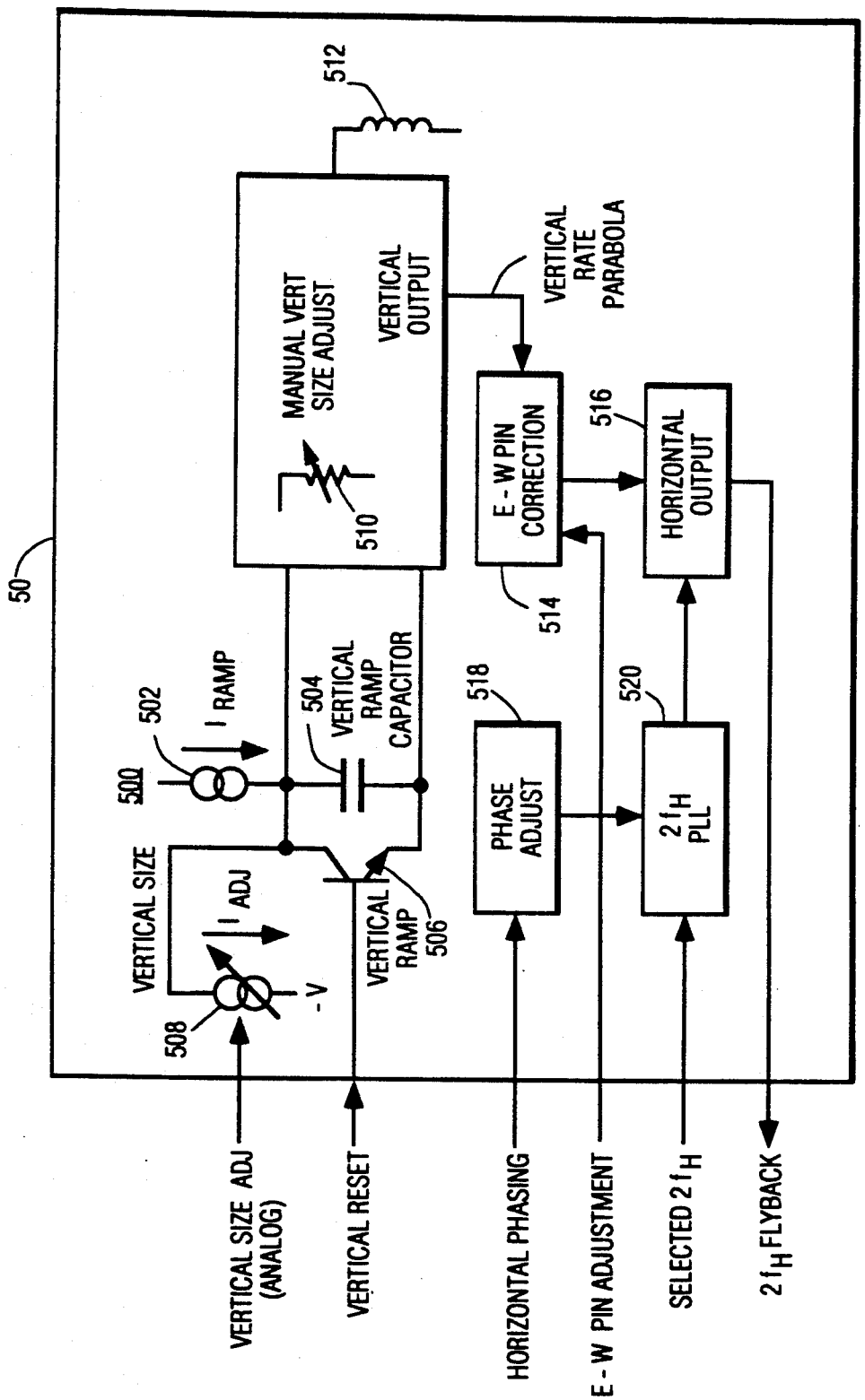
FIG. 2 is a combination block and circuit diagram illustrating the deflection circuit shown in FIG. 1.

The deflection circuit 50, shown in more detail in FIG. 2, receives a vertical reset signal from the wide screen processor 30, a selected 2$f_H$ horizontal synchronizing signal from the RGB interface 60, and additional control signals from the wide screen processor. The additional control signals relate to horizontal phasing, vertical size adjustment and east-west pin adjustment. The deflection circuit 50 supplies 2$f_H$ flyback pulses to the wide screen processor 30, the 1$f_H$ to 2$f_H$ converter 40 and the YUV to RGB converter 240.

The deflection circuit 50 is shown in more detail in FIG. 2. A circuit 500 is provided for adjusting the vertical size of the raster, in accordance with a desired amount of vertical overscan as necessary for implementing different display formats. As illustrated diagrammatically, a constant current source 502 provides a constant quantity of current I$_{RAMP}$ which charges a vertical ramp capacitor 504. A transistor 506 is coupled in parallel with the vertical ramp capacitor, and periodically discharges the capacitor responsive to the vertical reset signal. In the absence of any adjustment, current I$_{RAMP}$ provides the maximum available vertical size for the raster. This might correspond to the extent of vertical overscan needed to fill the wide screen display vertically by expanding a 4×3 format letterbox signal source such that the unused top and bottom portions are overscanned. To the extent that less vertical raster size is required, an adjustable current source 508 diverts a variable amount of current I$_{ADJ}$ from I$_{RAMP}$, so that the vertical ramp capacitor 504 charges more slowly and to a smaller peak value. Variable current source 508 is responsive to a vertical size adjust signal, for example in analog form, generated by vertical size control circuit 1030, shown in FIG. 2. Vertical size adjustment 500 is independent of a manual vertical size adjustment 510, which may be implemented by a potentiometer of back panel adjustment knob. In either event, the vertical deflection coil(s) receive(s) driving current of the proper magnitude. Horizontal deflection is provided by phase adjusting circuit 518, east-west pin correction circuit 514, a $2f_H$ phase locked loop 520 and horizontal output circuit 516.

FIG. 3 illustrates an automatic letterbox detector as part of a vertical size control circuit 1030. The vertical size control circuit comprises a letterbox detector 1032, a vertical display control circuit 1034 and a three-state output device 1036. Alternatively, the vertical blanking and vertical reset pulses can be transmitted as separate signals. The automatic letterbox detection circuit can automatically implement vertical zoom or expansion, typically by expanding a 4×3 format display ratio signal which includes a 16×9 format display ratio letterbox of active display area, and unused or matte colored top and bottom border areas. The letterbox detector can locate the active portion of the video by monitoring for a change in luminance between a given video line and a previous line, and controls expansion of the displayed the signal by a variable amount such that the first and last active video lines occupy the top and bottom of the display. Alternatively, the letterbox detector can be arranged to switch between discrete standard display ratios, such as necessary to zoom the 16×9 portion of a 4×3 signal to fill a 16×9 screen. When the output signal VERTICAL SIZE ADJ becomes active in that case, the display is zoomed. The deflection height is increased by 4/3 (see FIG. 2), which enables the active video portion of the letterbox signal to fill the wide screen display, without image aspect ratio distortion.

The vertical display control circuit 1034 also controls which part of the overscanned raster will be displayed on the screen, a feature referred to as vertical panning. If the vertically overscanned video signal is not in letterbox format, the conventional display format picture can be zoomed, that is expanded, to simulate a wide screen format. In this case, however, the portions of the picture cropped by the 4/3 vertical overscan will contain active video information. It is necessary to vertically crop ⅓ of the picture. In an AC-coupled vertical deflection system, and absent further controls, the top 1/6 and the bottom 1/6 will always be cropped. However, picture content may dictate that more of the top than the bottom of the picture is more appropriately cropped, or vice versa, in order that the more interesting part of the signal is saved, at the expense of a less interesting part. If all the action is at ground level, for example, a viewer might prefer to crop more sky. A vertical panning capacity enables a choice as to which part of the zoomed picture will be shown and which part will be cropped. Vertical panning is explained with reference to FIGS. 4 and 5(a) through 5(c). The three level composite vertical blanking/reset signal is shown at the top of the timing diagram in FIG. 4. These signals can be generated separately. The vertical blanking pulse begins when the signal L_COUNT is equal to VRT_BLNK0 and ends when L_COUNT is equal to VRT_BLNK1. The vertical reset pulse starts when L_COUNT is equal to VRT_PHASE. The L_COUNT is the output of a ten bit counter used to keep track of horizontal half lines with respect to the leading edge of VSYNC_MN. VSYNC_MN is the synchronized version of VDRV_MN, the vertical synchronizing component of the main signal provided to the gate array. VRT_BLNK0 and VERT_BLNK1 are provided by the microprocessor depending on the vertical panning command. VER_PHASE programs the relative phase of the VERT_RST output with respect to the rising edge of the vertical synchronizing component in the COMP_SYNC output. The COMP_SYNC output is the output of a J-K flip/flop. The state of the flip/flop is determined by decoding the outputs of L_COUNT and H_COUNT. H_COUNT is the horizontal position counter. The L_COUNT counter is used to segment the COMP_SYNC signal into three segments corresponding to the horizontal synchronizing pulse, the equalization pulse and the vertical synchronizing pulse.

A vertical deflection current for "no" overscan (which actually corresponds to a nominal 6% overscan) is shown by dotted lines in FIG. 4, as is the corresponding vertical blanking signal. The width of the vertical blanking pulse for no overscan is C. The vertical synchronizing pulse is in phase with the vertical reset pulse. A vertical deflection current for the overscan mode is shown by a solid line in FIG. 4, as is the corresponding vertical blanking pulse, having a pulse width D.

If the bottom overscan A is equal to the top overscan B, the display will be centered as shown in FIG. 5(a). If the vertical reset pulse is generated so as to lag the vertical synchronizing pulse, the bottom overscan A is less than the top overscan B, resulting the in display shown in FIG. 5(b), where more of the lower part of the picture is displayed while more of the top is blanked. Conversely, if the vertical reset pulse is generated so as to lead the vertical synchronizing pulse, the bottom overscan A is more than the top overscan B, resulting in the display shown in FIG. 5(c). More of the upper part of the picture is displayed and more of the bottom is blanked. The relative phase of the vertical synchronizing signal and the vertical reset signal is controllable the microprocessor WSP μP of the wide screen processor 30, to enable vertical panning during overscan modes of operation. It will be appreciated that the overscanned raster remains vertically centered, or symmetrical, on the picture tube or screen during vertical panning. It is the blanking interval which can be vertically moved, or positioned asymmetrically relative to the raster so as to blank more of the picture at the top than at the bottom, or vice versa.

One problem that is encountered when vertical panning is used occurs during special effects modes of VCR playback. It is desired to pan the video up (which can also be thought of as scrolling the displayed image down) by a slight amount (for example four or five lines), the vertical reset pulse is actually delayed from vertical sync by 262.5 lines, less the number of lines of the pan value. In the fast forward mode of a VCR, due to the non-standard nature of the linear tape speed, the number of lines in a field decreases by a number which is dependent on the recording mode (for example, SP or SLP) and the linear tape speed. A nominal number of lines per field contained in fast forward mode of VCR playback (SP mode) could be 253.5 lines. If the desired panning value is down by 5 lines, the delay setting would be for 257.5 lines. However, a new VSYNC occurs every 253.5 lines, resetting the half line counter which would generate vertical reset upon reaching the desired panning delay count. During this mode, a vertical reset will not occur because the half line counter will be repetitively reset without ever reaching the desired value, causing a collapse of the vertical raster and possible tube damage. It is thus necessary to ensure the occurrence of a vertical reset pulse regardless of the phase of VSYNC and the delay setting for vertical reset.

A circuit which forces a vertical reset is shown in FIG. 8. The basic circuit 1100 comprises a plurality of D-type flip/flops 1102, 1104, 1106, 1108 and 1110, a J-K flip/flop 1112 and a counter 1114, as well as a number of AND gates, NOR gates and inverters. The circuit is operated synchronously with a clock signal, which can be synchronized with the video, e.g., at $1024f_H$. The basic operation is as follows. The vertical sync signal is sampled by a signal designated SOL_X_2, which is a one clock wide pulse occurring twice per horizontal line period. Vertical sync has been processed in a way that it is offset from SOL_X_2, for example by 1/16 or ⅛ of a line period. Sampling vertical sync with SOL_X_2 realigns vertical sync with SOL_X_2. The STR_RST signal is a positive going pulse that is ½ of a line period long. The leading edge of this pulse signifies the beginning of the desired vertical reset interval. If the number of lines in a field are greater than or equal to the delay setting used to generate the STR_RST signal, the leading edge of STR_RST is used to clear counter 1114, which then counts for the desired vertical reset length and then disables itself. Vertical reset signal $V_{RST}$ is generated by a gate coupled to the output of counter 1114, and $V_{RST}$ is high (enabling the counter) during the vertical reset pulse. In this implementation, the desired vertical reset length is six half lines, the gate being coupled to the two and four bit counter outputs. Vertical reset lengths of other than six half lines may be selected by using the required counter outputs together with any gates needed to decode the outputs.

For the case where the number of lines in a field is less than the delay setting used to generate the STR_RST signal, the circuit ensures that a vertical reset is produced. On the leading edge of the sampled vertical sync signal, J-K flip/flop 1112 is set. The output of this flip/flop is used as an enable signal for gating through a trigger signal for the vertical reset on the next sampled vertical sync signal VSYNC, namely if J-K flip/flop 1112 has not in the meanwhile been reset by the occurrence of STR_RST. If an STR_RST pulse has not occurred since flip/flop 1112 was set, the leading edge of the next sampled vertical sync signal clears the counter 1114 used to generate the $V_{RST}$ signal. Signal $V_{RST}$, generated from a gate on the outputs of the counter, then goes high until counter 1114 accumulates the required count of half lines from SOL_X_2. In this manner, it is assured that as long as a VSYNC signal is present, a $V_{RST}$ pulse will be generated of the correct length regardless of the number of lines in a field or the delay setting desired for the STR_RST signal. If a STR_RST pulse does not occur, the leading edge of that signal clears the J-K flip/flop and generates a $V_{RST}$ signal based on the STR_RST pulse.

For a standard NTSC signal (having 262.5 lines per field, that is 525 half lines), both panning up and panning down may be accomplished by delaying the vertical reset signal by an amount less than or equal to one field. Panning down is accomplished by counting a delay or zero to 262.5 half lines; and panning up is accomplished by counting a delay between 262.5 and 525 half lines. A problem with this approach is that, for nonstandard signals, the field lengths may not be equal. One example is the pause mode for a dual azimuth four head VCR. Whereas the field lengths are unequal, counting for greater than one half of a field for panning up (scrolling down) causes the two fields in the frame to become misaligned by a number of lines equal to the difference in the field lengths. A severe interline flicker thus occurs.

The circuit according to FIGS. 9 and 10 overcomes this problem. Instead of delaying the vertical reset by nearly a full field, the circuit delays vertical reset for nearly a full frame, i.e., by two fields. This corrects the problem with interline flicker. This timing arrangement is shown in FIG. 7.

Panning down is accomplished in the usual manner, i.e., by delaying between zero and 262.5 half lines. However, panning up is accomplished by delaying just less than a frame, i.e., between 787.5 and 1050 half lines. In this manner, panning is accomplished and interline flicker is removed because the distance from the vertical reset pulse to the beginning of the video field is now constant.

Whereas according to the invention it is necessary to delay for a full frame when panning up, and it is also necessary to process the panning delay for each of the fields in the frame, counter 1202 (U3) and counter 1204 (U4) are provided, each counter being operable to count the number of half lines in the panning delay for one of the respective fields. Both counters accumulate a count of pulses on signal SOL_X_2, which occur twice per horizontal line. Two flip/flops U1, U2 coupled to VSYNC and to SOL_X_2 and the gating shown form a toggling circuit that selects one of the counters 1202, 1204 representing the present field. In an alternating manner upon the occurrence of VSYNC, the vertical sync pulse detected in the video signal, one of the two counters 1202, 1204 is cleared to begin a new cycle. The outputs of the counters 1202, 1204 are coupled respectively as inputs to comparators 1212 (U5) and 1214 (U6), the other input being VPHASE, the line count of the desired delay. VPHASE can be a ten bit word generated by the wide screen processor, normally in response to a selection made manually by the user, for example on a remote controller or a switch input (not shown).

When the delay line count in either counter 1202 or 1204 equals the required delay represented by VSYNC, the output of the respective comparator 1212, 1214 goes true, and synchronously with the system clock CLK, this result is loaded into a respective D-type flip/flop U7 or U8, and shifted through D-type flip/flop 1218 (U9) to produce the signal STR_RST. STR_RST is coupled to circuit 1300, shown in detail in FIG. 10. Also coupled to circuit 1300 are the SOL_X_2, VSYNC and CLK signals, as well as system overall reset signal RSTn.

The occurrence of signal STR_RST indicates that the line count has reached the desired delay, and a vertical reset is required. However, as noted above, it is possible in certain modes of operation that VSYNC could occur, resetting the line count, before the delay elapses, thus preventing the generation of a vertical reset. In order to prevent such an occurrence and force a vertical reset to occur in every case, the VSYNC signal is coupled to D-type flip/flop 1310 (U10), which sets enable J-K flip/flop 1312 (U12) via a one-clock wide pulse VSYNC_E, at the leading edge of VSYNC. Signal STR_RST is similarly coupled to D-type flip/flop 1314 (U11) for resetting enable J-K flip/flop 1312. Flip/flops 1312 and 1314 provide short pulses synchronous with the clock, upon occurrence of VSYNC and STR_RST, respectively, which pulses are coupled to the J and K inputs of enable flip/flop 1312. Thus, if STR_RST occurs, or if VSYNC occurs again before STR_RST, the enable flip/flop 1312 is cleared and an output pulse is gated to clear 5—bit counter 1316 (U0). $V_{RST}$ then goes high, and remains high (the counter being enabled) until the desired count is reached. In this example, $V_{RST}$ is coupled to the most significant bit of the counter output, defining a pulse width of sixteen half lines.

According to the invention, the up panning delay is counted from the beginning of one of the respective fields to a point referenced to the next occurrence of the same field. Thus, there is no problem with unequal field lengths, interline flicker does not occur, and there is no possibility that the raster could collapse vertically.

The foregoing discussion with respect to generation of the vertical reset pulse $V_{RST}$ is also applicable to generation of the vertical blanking pulse. The vertical blanking pulse must also be delayed, and this can be accomplished in the same manner. However, the panning delay count and the width of the blanking pulse are different than the delay count and width of the vertical reset, as shown in FIG. 4. The panning delay applicable to the blanking pulse is determined by the wide screen processor to complement the panning delay applicable to $V_{RST}$. The blanking pulse width is similarly determined, and can be generated using a counter in substantially the same manner as explained in detail with respect to the vertical reset pulse.

What is claimed is:

1. A television apparatus, comprising:
   means for displaying a video signal, said video signal having a vertical synchronizing component dividing groups of successive horizontal lines into successive vertical scanning intervals; and,
   panning control means for counting said horizontal lines and generating a vertical reset signal variably shifted in phase relative to said vertical synchronizing component of said video signal, said phase shift varying in a first range for vertically panning said video signal down and varying in a second range for vertically panning said video signal up, said first and second ranges being in different ones of said vertical scanning intervals with respect to each said vertical synchronizing component.

2. The apparatus of claim 1, wherein any given one of said vertical synchronizing components defines a first vertical scanning interval following said vertical synchronizing component and a second vertical scanning interval following said first vertical scanning interval, said first range extending over approximately a first half of said first vertical scanning interval and said second range extending over approximately a second half of said second vertical scanning interval.

3. The apparatus of claim 1, further comprising means for zooming said video signal to exceed said display means in vertical size, said panning control means determining which vertically defined portion of said video signal appears on said display means.

4. The apparatus of claim 1, wherein said panning control means is responsive to user commands.

5. The apparatus of claim 1, wherein said panning control means counts horizontal half lines from said vertical synchronizing components, said first range being between zero and 262.5 half lines and said second range being between 787.5 and 1050 half lines.

6. The apparatus of claim 1, wherein said video display means comprises a wide screen video display unit having a horizontal to vertical aspect ratio greater than 4:3.

7. The apparatus of claim 1, further comprising an AC coupled vertical deflection system.

8. The apparatus of claim 1, wherein said panning control means comprises:
   means for generating a line signal representing horizontal lines;
   means for establishing a panning delay line count;
   first and second counters responsive to said line signal generating means for accumulating respective line counts;
   means for resetting said first and second counters in an alternating manner responsive to said vertical synchronizing components; and,
   at least one comparator for generating said vertical reset signal when one of said line counts equals said panning delay line count.

9. The apparatus of claim 8, further comprising a toggling circuit responsive to said vertical synchronizing component and operable to gate said line signal to a count input of that one of said counters corresponding to a present one of said fields.

10. The apparatus of claim 8, wherein said line signal comprises two pulses per horizontal line.

11. The apparatus of claim 8, wherein said at least one comparator comprises a comparator coupled to each of said counters and to said means for establishing said panning delay line count.

12. The apparatus of claim 1, wherein said panning control means properly generate said first and second ranges even when successive ones of said vertical scanning intervals have different numbers of said horizontal lines.

13. A television apparatus, comprising:
   means for displaying a video signal, said video signal having a vertical synchronizing component dividing groups of successive horizontal lines into successive fields, successive frames being defined by a successive number of said fields; and,
   means for generating a vertical reset signal delayed by a variable pan delay relative to said vertical synchronizing component of said video signal for vertically panning said video signal up on said video display means, said variable pan delay being longer than one of said fields and shorter than one of said frames.

14. The apparatus of claim 13, further comprising an AC coupled vertical deflection system.

15. The apparatus of claim 13, wherein means for generating said vertical reset signal comprises:
   means for generating a line signal representing horizontal lines;
   means for establishing a panning delay line count;
   first and second counters responsive to said line signal generating means for accumulating respective line counts;
   means for resetting said first and second counters in an alternating manner responsive to said vertical synchronizing components of said successive fields of said frames; and,
   at least one comparator for generating said vertical reset signal when one of said line counts equals said panning delay line count.

16. The apparatus of claim 13, wherein said variable pan delay is longer than approximately one and one-half of said fields.

17. The apparatus of claim 13, wherein said means for generating a vertical reset signal comprises a counter for said horizontal lines.

18. The apparatus of claim 13, wherein said means for generating a vertical reset signal comprises a half line counter for said horizontal lines.

19. The apparatus of claim 13, wherein said means for generating said vertical reset signal generates said variable pan delay less than one field for vertically panning said video signal down.

20. The apparatus of claim 19, wherein said variable pan delay is less than approximately one-half field.

21. The apparatus of claim 19, wherein said up variable pan delay and said down variable pan delay define first and second mutually exclusive panning ranges.

* * * * *